United States Patent Office 3,759,776
Patented Sept. 18, 1973

3,759,776
PROCESS OF FORMING UPHOLSTERY
Donald L. Decker, Newburgh, N.Y., assignor to Stauffer Chemical Company, New York, N.Y.
No Drawing. Original application Sept. 11, 1967, Ser. No. 666,941, now Patent No. 3,652,359. Divided and this application July 8, 1971, Ser. No. 160,940
Int. Cl. B32b 7/12; C09j 5/04
U.S. Cl. 156—309                           6 Claims

ABSTRACT OF THE DISCLOSURE

A process for molding an article of manufacture consisting of forming a laminate composed of a stretch fabric bonded to stretchable plastic film with an adhesive system. The laminate is heated to between 270–295° F. and molded under pressure of 2 to 8 p.s.i.a. and products formed by said process.

RELATED APPLICATION

This application is a division of application Ser. No. 666,941, filed Sept. 11, 1967, now Pat. No. 3,652,359.

BACKGROUND OF THE INVENTION

In the field of upholstery, increasing use is being made of composite constructions of flexible vinyl plastic which are formed of vinyl compositions that are reinforced with fabrics. Since these laminates are ordinarily applied to shaped surfaces, such as seats and the backs of chairs, the primary requirements are that the laminates have sufficient stretch to fit well over the contours encountered. However, with the advent of more complex shapes, particularly the automotive upholstery field, it becomes very difficult to achieve proper tailoring by conventional methods.

In order to overcome this problem, it has been proposed to shape the laminates by a post-forming operation into the desired configuration. Thus, a vacuum thermoforming method is commonly employed and consists of shaping a heated laminate over a mold by employing negative pressure as the forming force. However, a significant problem has been encountered in the use of laminates in forming of shaped articles by this technique because of the inability of commercially available laminates to satisfactorily conform to the mold, particularly where there is a need for large area increases and where approximately 90° turns or even small radius turns are part of the mold configuration. Moreover, the commercial laminates cannot satisfactorily retain their molded shape for an appreciable period of time. Additionally, these laminates have a tendency to telegraph the fabric pattern through the vinyl compound thus destroying the aesthetic effect of the patterns imprinted upon the vinyl films.

BRIEF DESCRIPTION OF THE INVENTION

It has been discovered that vinyl compounds formed into film can be reinforced with a particular type of fabric material and be formed into suitable three dimensional articles without telegraphing the pattern of the fabric material, yet the end product has high shape retentive properties. The reinforcing fabric useable with the present invention must be provided with a stretchability of at least 150% in either the machine or cross-machine direction in order for the composite construction to be useful in forming the complex shapes encountered in commercial upholstering. The fabric is coated with a latex base resin and dried and thereafter laminated to a vinyl film which has been coated with a plastisol adhesive material. The laminate is then heated to between critical temperature limitations and formed by differential pressure into a three dimensional end product. The vinyl compound employed with the present invention is based on medium molecular weight polyvinyl chloride compounded in such a way as to be capable of being stretched and formed in the conventional thermoformable-vacuum operation with negligible post-formed recovery of its initial flat sheet configuration.

DETAILED DESCRIPTION OF THE INVENTION

In the practice of the present invention, a laminate consisting of vinyl film reinforced with a fabric is formed. The fabric employed with the present invention may be defined as crimped yarns made from thermoplastic fiber, usually in the form of continuous filament nylon, and is capable of a pronounced degree of stretch and rapid recovery. This property is conferred on yarn that has been subjected to an appropriate combination of deforming, heat setting and developing treatments. Crimp elongation can be defined as the percent increase in length obtained in crimped yarn when the yarn is extended to remove the crimp without further drawing the yarn filaments. These crimp yarns may be obtained by such methods as passing yarn over an edge, passing the yarn through a stuffer box, twisting, heat-setting, and detwisting or false-twisting and heat-setting simultaneously. When using the combination of heat-setting and twisting, the yarns are usually plied to control the elasticity of the final product. Jet texturing technology may also be applied to obtain the yarns of this invention. However, the crimp elongation of the yarn is critical and must be above 100% in either the machine or cross-machine direction in order to allow the yarn to be knit and finished by conventional textile processses into a fabric possessing the required minimum elongation of 150% at 5 lb. modulus. The weight of the finished fabric may range between 1½ and 10 ounces per square yard but is preferably between 2 and 4 ounces per square yard.

The film material employed with the present invention may be any thermoplastic material that is capable of being stretched or molded. However, the flexible vinyl plastic such as those compounds formed from polyvinyl chloride are preferred. The polyvinyl chloride compounds may be defined as a film material which consists of the resinous material having conventional extenders, plasticizers, stabilizers and pigments commonly employed therein. However, the amount of plasticizer added should not exceed 42% based on the combined weight of resin and plasticizer. The thickness of the film material may range between 10 to 50 mils, but 25 to 40 mils is preferred in practicing the degree of forming required in preparing upholstery articles.

The reinforcing fabric may be secured to the sheet material by a dual or honeymoon type adhesion system. Thus, the fabric must be sprayed on one side thereof with a latex base resinous adhering material. It is then dried and formed into rolls and stored, if desired. One such latex resin adhesive which has been found to function satisfactorily is plasticized polyvinyl chloride latex. Upon drying the latex material, the fabric is provided with a sufficient degree of stability to resist elongation when pulled under tension through the laminating apparatus. This degree of stability is essential to the practice of this invention; otherwise, the fabric will stretch out of its original proportions, i.e., length and width, which would not provide the end product with the 150% elongation required of the fabric. It has been found that between 0.25 and 4 oz./yd.$^2$ resin solids must be applied to the fabric, but preferably between 1 and 2 oz./yd.$^2$.

Preferably, the method of application of a latex material to the fabric is by spraying the fabric while it is supported from distorting under the weight of the added adhesive. This can be brought about by employing a horizontally moving support structure the same width as the fabric with the edges of the fabric secured to a tenterframe moving the same speed as a supporting structure.

The plastic film material is then coated with a vinyl plastisol material and thereafter the fabric with the dried latex material thereon is immediately applied thereto while the plastisol material is in a wet condition. The materials are then heated and pressed together in a conventional manner to adhere the reinforcing fabric to the film. The plastisol material may be applied to the film by well known techniques such as reverse roll coating, or the like. It should be noted that the plastisol material is applied to the film without an organic solvent carrier or vehicle. Thus, when the fabric is laminated to the film under heat and pressure, there is no necessity of evaporating an organic solvent. Therefore, a much faster laminating operation is achieved. After the fabric has been laminated to the film material, it is rolled up and stored until it is desired to form the same into the desired contour.

In forming the laminate into the desired contour, a thermoformable-vacuum technique is employed. In this operation, the laminate is first heated to between 275° to 295° F. but preferably between 278 and 285° F., measured in the vinyl sheet constituent of the composite. It is essential that this temperature range be employed in the practice of the present invention. As will hereinafter be illustrated, a too cold temperature will result in poor shape retention of the formed part while too high of a temperature promotes telegraphing of the fabric. After the laminate has been heated to the proper temperature, it is placed into a vacuum forming machine and a negative pressure of between 2 and 8 p.s.i.a. is applied to the underside thereof. Since the molds employed are in a cold state, the laminate will immediately cool when the same comes in contact therewith and the shape so formed will be retained over a substantial length of time.

The following examples are illustrative of this invention but not intended to be limiting.

EXAMPLE 1

A stretch nylon knit fabric weighing 2.7 ounces per square yard and having a dynamic stretch at 5 lb. modulus of 150% in a machine direction and 250% in a cross-machine direction was laminated to a specifically formulated vinyl sheet 33 mils thick with 42% plasticizer added and having a hot melt viscosity equivalent to 1200 meter grams of torque at 160° C. and tensile modulus at 75° F. of 2500 p.s.i. The resulting laminate has elongation at break of 190% in a machine direction and 230% in a cross-machine direction and a tensile strength in the M.D. at 75° F. of 85 lbs./inch of width. The resulting laminate was thermoformed at 280° F. and 5 p.s.i.a. pressure into a complex shape requiring localized area increases of 150% and general area increases of 100% with good reproduction of mold details. No fabric pattern transfer to the vinyl surface was evident, i.e., telegraphing, and the formed shape was essentially dimensionally stable, that is, no change in dimension of the formed part in excess of 3% occurred after the part was removed from the mold and allowed to age at room temperature indefinitely, or after accelerated ageing at 180° F. for 10 minutes.

EXAMPLE 2

A stretch nylon knit fabric weighing 2.7 ounces per square yard but having a dynamic stretch of 150% at 5 lbs. modulus in a machine direction and 195% in a cross-machine direction, was laminated to the sheeting of exactly the same nature as described in Example 1. The resulting laminate had elongation at break of 135% in the machine direction and 205% in the cross-machine direction and a tensile strength in the machine direction at 75° F. of 95 lbs. per inch of width. The resulting laminate was thermoformed at 280° F. and 5 p.s.i.a. pressure into the same complex shape having the same area increase requirements as described in Example 1. Poor reproduction of mold detail resulted in those areas where the requirements for the mold called for greater formability than was available in this sample stretch nylon knit fabric with substantial telegraphing of the fabric pattern into the vinyl film.

EXAMPLE 3

The procedure of Example 1 was repeated in its entirety except the vinyl sheeting was compounded with 10% more plasticizer than that used wtih the compound of the sheeting of Example 1 which produced a vinyl sheet having a hot melt viscosity equivalent to 850 milligrams of torque at 160° C. and a tensile modulus at 75° F. of 1750 p.s.i. The resulting molded product exhibited substantial telegraphing of the fabric pattern.

EXAMPLE 4

The procedure as set forth and outlined in Example 1 was repeated in its entirety except that 10% less plasticizer was used in compounding the vinyl sheeting which resulted in stiff pliability of the resulting sheeting which resulted in a molded product of aaesthetically unacceptable article showing post-formed dimensional stability changes of 7 to 10% after ageing, which is unacceptable.

EXAMPLE 5

The procedure as set forth in Example 1 was repeated in is entirety except the composite laminate was heated to a temperature of 300° F. The excessive softening of the vinyl sheet resulted in telegraphing of the fabric pattern through the vinyl sheet when the differential pressure was applied. This destroyed the appearance of the decorated surface of the vinyl.

EXAMPLE 6

The experiment as set forth in Example 1 was repeated in its entirety except the composite laminate sheet was heated to only 270° F. The resulting formed shape was dimensionally unstable exhibiting after ageing a dimensional change in stretched areas of 9% in one direction and 11% in another direction, rendering the form shape unuseable in fitting it to a cushion of predetermined size.

EXAMPLE 7

A stretch nylon knit fabric having a stretch at 5 lb. modulus of 165% in the machine direction and 270% in the cross-machine direction was laminated without prior fabric spray finishing in a continuous roll-type laminator to vinyl sheeting having applied thereto the same vinyl plastisol adhesive as described in Example 1. The resulting laminate had an elongation at 30 lbs. modulus of 118% in the machine direction and 240% in the cross-machine direction and elongations at ultimate tensile strength of 141% in the machine direction and 305% in the cross-machine direction. The resulting laminates were unsuitable for molding by virtue of possessing inadequate elongation to reproduce the details of the mold because of distortion and stretching of the untreated fabric during the lamination process.

While details of the preferred embodiment have been set forth above, it will be readily apparent that many changes and modifications may be made therein without departing from the spirit of the invention.

What is claimed is:

1. The process of manufacturing an article comprising the steps of:
   (a) spraying a first vinyl base latex adhesive material on one surface of a stretch fabric, said fabric having at least 150% elongation in a machine direction and cross-machine direction;

(b) drying said first vinyl base latex adhesive material;

(c) applying a second vinyl plastisol adhesive material to one surface of a stretchable plastic film formed of a vinyl compound having a plasticizer concentration of about 42% by weight of the combined plasticizer and vinyl composition, said film having a thickness of between 10 and 50 mils;

(d) bonding said fabric to said plastic film with said first and second adhesive material in contact with one another, wherein said second adhesive material is in a wet condition, under heat and pressure to form a composite laminate.

2. The process as set forth in claim 1, wherein said fabric is nylon and has a weight of between 1.5 and 10 ounces per square yard.

3. The process as set forth in claim 1, wherein said film is polyvinyl chloride.

4. The product of process claim 1.
5. The product of process claim 2.
6. The product of process claim 3.

References Cited
UNITED STATES PATENTS

| | | | |
|---|---|---|---|
| 2,706,699 | 4/1955 | Plansoen et al. | 156—333 X |
| 3,067,085 | 12/1962 | Limperos | 156—327 |
| 2,700,630 | 1/1955 | Bukey et al. | 161—88 |
| 2,961,343 | 11/1960 | Atwell | 117—76 |

DOUGLAS J. DRUMMOND, Primary Examiner

R. A. DAWSON, Assistant Examiner

U.S. Cl. X.R.

117—138.8, N, 161 UF; 156—310, 333; 161—76, 88, 227